(12) United States Patent
Luo et al.

(10) Patent No.: US 7,883,274 B2
(45) Date of Patent: Feb. 8, 2011

(54) BAIL TYPE UNLOCKING DEVICE FOR OPTO-ELECTRONIC MODULE

(75) Inventors: Jianfeng Luo, Hubei (CN); Benqing Quan, Hubei (CN); Biao Wang, Hubei (CN)

(73) Assignee: Wuhan Telecommunications Devices Co., Ltd., Hongshan District, Wuhan, Hubei (CN)

( * ) Notice: Subject to any disclaimer, the term of this patent is extended or adjusted under 35 U.S.C. 154(b) by 0 days.

(21) Appl. No.: 12/306,174

(22) PCT Filed: Nov. 7, 2006

(86) PCT No.: PCT/CN2006/002981
§ 371 (c)(1),
(2), (4) Date: Feb. 26, 2009

(87) PCT Pub. No.: WO2008/003186
PCT Pub. Date: Jan. 10, 2008

(65) Prior Publication Data
US 2009/0279831 A1 Nov. 12, 2009

(30) Foreign Application Priority Data
Jun. 29, 2006 (CN) .................... 2006 2 0097447 U (51) Int. Cl.
*G02B 6/36* (2006.01)
(52) U.S. Cl. ............................ 385/53; 385/92; 385/134
(58) Field of Classification Search .................... 385/53, 385/88, 92
See application file for complete search history.

(56) References Cited

U.S. PATENT DOCUMENTS

| 6,824,416 B2 | 11/2004 | Di Mascio |
| 6,851,867 B2 * | 2/2005 | Pang et al. ..................... 385/88 |

FOREIGN PATENT DOCUMENTS

CN 2687957 Y 3/2005

* cited by examiner

*Primary Examiner*—Sarah Hahm
(74) *Attorney, Agent, or Firm*—Cohen Pontani Lieberman & Pavane LLP (57) ABSTRACT

A bail type-unlocking device for an opto-electronic module, which pertains to an unlocking device for a hot pluggable type opto-electronic module in the optical communication field. The unlocking device includes: a bottom housing; an operating unit; a latching unit; an elastic element; and a briquetting; wherein: the latching unit is movably engaged with the bottom housing; the elastic element is provided between the latching unit and the bottom housing, and the latching unit can be movable relative to the bottom housing under the elastic force of the elastic element; the operating unit is configured to be engaged with the bottom housing, when an external force from an operator is applied to the operating unit, the operating unit pivots around a pivot axis thereof with respect to the bottom housing to drive the latching unit so that the latching unit can be movable between a locked position and an unlocked position with respect to the bottom housing; and the briquetting is fixed on the bottom housing and engages with the operating unit, when the latching unit is located at the unlocked position, the briquetting restricts the pivot movement of the operating unit around the pivot axis with respect to the bottom housing.

25 Claims, 5 Drawing Sheets

BAIL TYPE UNLOCKING DEVICE FOR OPTO-ELECTRONIC MODULE

PRIORITY CLAIM

This is a U.S. national stage of application No. PCT/CN2006/002981, filed on Nov. 7, 2006. Priority is claimed on the following application(s): Country: China, Application No.: 200620097447.6, Filed: Jun. 29, 2006, the content of which is incorporated here by reference.

BACKGROUND OF THE INVENTION

1. Field of the Invention

The present invention pertains to optical communication field. The present invention generally relates to an unlocking device for a hot pluggable type opto-electronic module, and particularly, to a bail type unlocking device for opto-electronic module.

2. Description of the Related Art

Conventionally, the unlocking device used for a hot pluggable opto-electronic module is of push-and-pull or bail type. An unlocking device for SFP (Small Formfactor Pluggable) module generally adopts a push-and-pull or bail type structure; an unlocking device for XFP (10 Gigabit Small Formfactor Pluggable) Module mainly adopts the bail type structure.

In the push-and-pull structure, a pushing block pushes up a locking elastic piece of a module mounting cage so that the module is unlocked, whereas the bail type structure is generally comprised of a rotatable bail and a latching slider for controlling unlocking thereof, and the unlocking is achieved by the elastic piece of the cage being jacked up via the stroke of the latching slider controlled by the rotating of the bail.

The conventional bail type structure normally adopts a bail and a latching slider of a sheet-metal member. And the bail and the latching slider maintains mutual movement relationship by a pin and a corresponding slot, or a press mold bail and latching slider can be used, however, a pin and a slot have to be used for securing the mutual movement relationships therebetween.

The disadvantages or problems of the prior art mainly lie in the following:

The sheet-metal pieces unavoidably have burrs with uncomfortable feelings;

The pin is hard for manufacturing, which is difficult to be connected to the bail;

The slot is hard for manufacturing, the burrs can not be easily removed, and the precision thereof can not be easily controlled etc.

SUMMARY OF THE INVENTION

The present invention is mainly for solving the above mentioned shortcomings or disadvantages in the prior art. The present invention provides a bail type unlocking device for an opto-electronic module, which has a practical structure with simple configuration and operation, and the unlocking device is adapted to the requirements for the development of communication apparatus.

To achieve the above mentioned object of the present invention, the present invention provides a bail type unlocking device for an opto-electronic module for unlocking the opto-electronic module in a locked position from a cage, the unlocking device comprising:

a bottom housing;
an operating unit;
a latching unit;
an elastic element; and
a briquetting; wherein:
the latching unit is movably engaged with the bottom housing;
the elastic element is provided between the latching unit and the bottom housing, and the latching unit being movable relative to the bottom housing under the elastic force of the elastic element;
the operating unit is configured to be engaged with the bottom housing, when an external force from an operator is applied to the operating unit, the operating unit pivots around a pivot axis thereof with respect to the bottom housing to drive the latching unit so that the latching unit can be movable between a locked position where the latching unit engages with the cage to lock the latching unit with the cage, and a unlocked position where the latching unit disengages with the cage to unlock the latching unit from the cage with respect to the bottom housing; and
the briquetting is fixed on the bottom housing and engages with the operating unit, when the latching unit is located at the unlocked position, the briquetting restricts the pivot movement of the operating unit around the pivot axis with respect to the bottom housing.

Preferably, the unlocking device further includes a top housing which is fixedly connected to the bottom housing.

Preferably, the bottom housing has a substantially rectangular parallelepiped chamber body.

Preferably, the top housing is a rectangular cover adaptable to the bottom housing.

Preferably, first sliding slots are provided at both sides of the chamber body, and the latching unit slides in the first sliding slots.

Preferably, the latching unit includes a U shaped body and two delatching arms, wherein the U shaped body 4a is perpendicular to the delatching arms.

Preferably, second sliding slots are provided at both sides of the chamber body, wherein the elastic element slides in the second sliding slots.

Preferably, the U shaped body is provided with a spring briquetting; and delatching blocks are provided at ends of the delatching arms.

Preferably, the spring briquetting of the latching unit form a square hole with the second sliding slots to confine the movement of the elastic element, and an end of the elastic member acts on the bottom housing, with the other end thereof acting on the spring briquetting of the latching unit.

Preferably, the elastic element is a compression spring.

Preferably, the operating unit is a substantially U shaped half ring which comprises a handhold cross arm and two suspending arms.

Preferably, each of the suspending arms 3d has a rotor pin as the pivot axis and a stop pin.

Preferably, the briquetting comprises: a substantially rectangular briquetting plate; and pin briquettings provided at both ends of the briquetting plate, respectively.

Preferably, the briquetting plate comprises a fixing hole and counterbores for fixing with screws; and the pin briquetting comprises stopping slots 6e and rotor pin fixing slots.

Preferably, a briquetting fixing pin and a screw hole are provided on the bottom housing; the fixing hole engages with the briquetting fixing pin; and the briquetting is fixedly connected with the bottom housing via screws penetrating through the counterbore and the screw hole.

Preferably, rotor pin fixing slots are provided at both sides of the chamber body.

Preferably, the rotor pin fixing slot on the bottom housing defines a circular hole with the rotor pin fixing slot in which the pivot axis rotates.

Preferably, the stop pin of the operating unit contacts the stop slot of the pin briquetting so that the pivot movement of the operating unit can be stopped.

Preferably, the operating unit is a substantially U shaped half ring which comprises a handhold cross arm and two suspending arms.

Preferably, the two suspending arms of the operating unit always tangentially contact the U shaped body of the latching unit.

According to another aspect of the invention, a bail type unlocking device for an opto-electronic module is provided, comprising:

a bottom housing of a rectangular parallelepiped chamber body having a plurality of sliding slots;

a top housing;

a bail being formed as a U shaped half ring having a handhold cross arm and two suspending arms, each suspending arm having a rotor pin;

a latching slider comprised of a U shaped body and two delatching arms;

a spring;

a briquetting, having a briquetting plate and a pin briquetting;

a screw;

wherein:

the bottom housing is fixedly connected with the top housing via screws;

the two delatching arms of the latching slider are movably inserted into two first sliding slots at side walls of the bottom housing;

the spring is provided in two second sliding slots at side walls of the bottom housing to elastically acting between the latching slider and the bottom housing;

the two suspending arms of the bail are inserted into the bottom housing to pivot around a rotor pin with respect to the bottom housing and the latching slider;

the briquetting is fixed on the bottom housing by the screw, in which the bail forms a circular hole in which the rotor pin rotates with the bottom housing and the briquetting to achieve engagement therebetween via the circular hole.

The operation principles of the invention are stated as following:

The bail pushes the latching slider to the unlocked position in a lever form during rotation. In this process, the spring always applies an acting force to the latching slider in an opposing direction. Meanwhile, the bail provides a pushing force for the latching slider via a tangential point that contacts the latching slider to ensure that the latching slider moves to the unlocked position. The bail is released when unlocking is completed, at this time, the pushing force of the bail is withdrawn. And the latching slider starts resetting movement under the action of the spring, and a force is provided for the bail via the tangential point with the bail. Consequently, a moment for resetting the bail 4 is obtained.

The present invention has the following advantages:

1. The structure of the invention is optimized, the manufacturing of the parts are simplified and the reliability of the parts is improved.

2. The installation and unlocking operation completely comply with the usual practice of people, and therefore additional identifying and memorizing work are not necessary.

3. The assembling operation of the module is very simple and the speed of assembly is improved.

4. The bail can be reset to its start position without manual operation.

BRIEF DESCRIPTION OF THE DRAWINGS

The additional objects, features and advantages of the invention will become apparent from the following description in detail with reference to the accompanying drawings, wherein similar parts are designated with similar reference numbers.

DETAILED DESCRIPTION OF THE PREFERRED EMBODIMENT

Reference will now be made in detail to the preferred embodiments of the present application. It can be appreciated that various modifications in many different ways can be made to the following illustrative embodiments of the present invention without departing the principle of the present invention disclosed herein. Therefore, the scope of the present invention will in no way be limited to the special embodiments in the following.

Firstly, description will be made to the structure of the major components of the preferred embodiment of the present invention. It is noted that not all of the following components or its particular constituent parts are necessary for realizing the purpose of the present invention. The following description to the structure of the major components shall not be construed as limiting the protection scope of the present invention.

1. Bottom Housing 1

Figure 2:
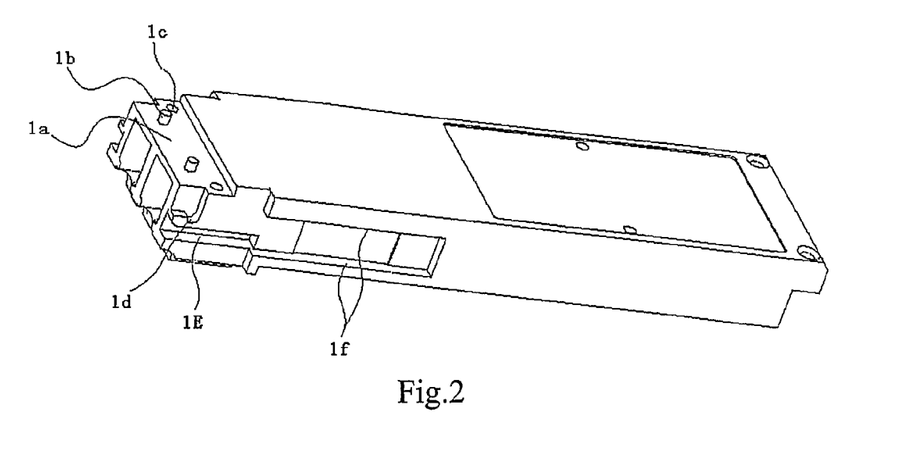
FIG. 2 is a structural schematic view of the bottom housing 1.

As shown in FIG. 2, the bottom housing 1 is provided as a substantially rectangular chamber body having a plurality of sliding slots. A briquetting fixing pin 1*b* and a screw hole 1*c* is provided on an upper end surface 1*a* of the bottom housing 1 (left upper end face indicated in the FIG. 2). A rotor pin fixing slot, a spring fixing slot and a latching slider slot are provided at both side walls of the chamber body of the bottom housing, respectively. As shown in FIG. 2, the latching slider slot is a large groove in which two delatching arms (as will be described later) of the latching slider can slide. And a spring fixing slot is a small groove in which a spring can slide.

2. Top Housing 2

Figure 3:
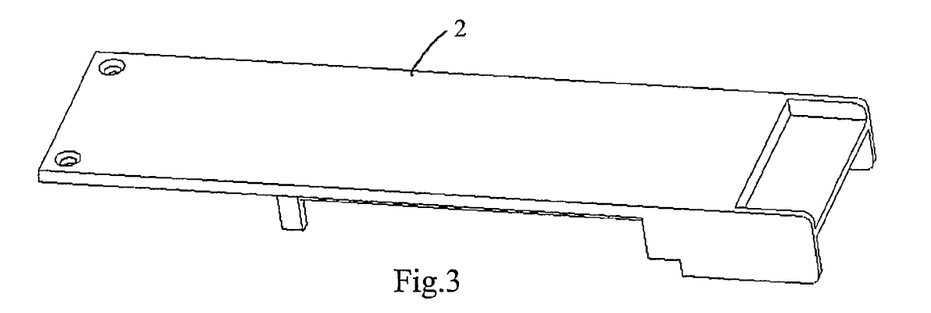
FIG. 3 is a structural schematic view of the top housing 2.

As shown in FIG. 3, the top housing 2 is configured to be a rectangular cover which can be adapted to the housing. Referring FIG. 1, the bottom housing 1 and the cover 2 can be fixedly connected by screws. Obviously, a person normally skilled in the art should understand that the cover 2 can be omitted in practice.

3. Bail 3

Figure 4:
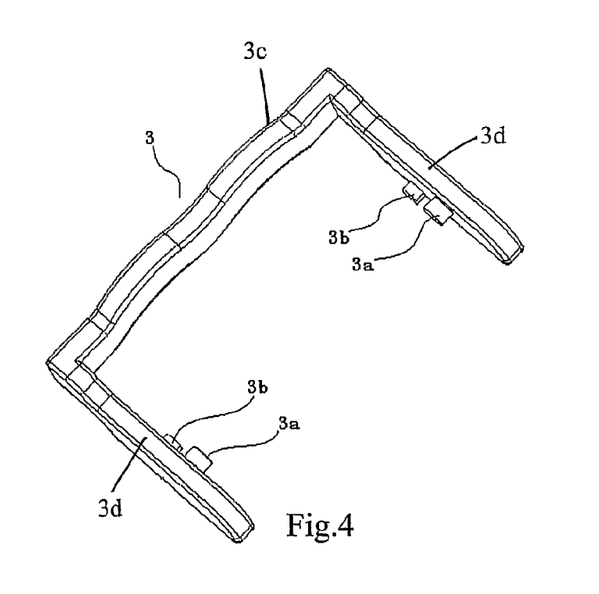
FIG. 4 is a structural schematic view of the bail 3.

As shown in FIG. 4, the bail 3 as the operating unit for an operator operating the unlocking device is provided as a U shaped half ring comprising a handhold cross arm 3c and two suspending arms 3d, a rotor pin 3a and a stop pin 3b are provided on the each suspending arms 3d.

4. Latching Slider 4

Figure 5:
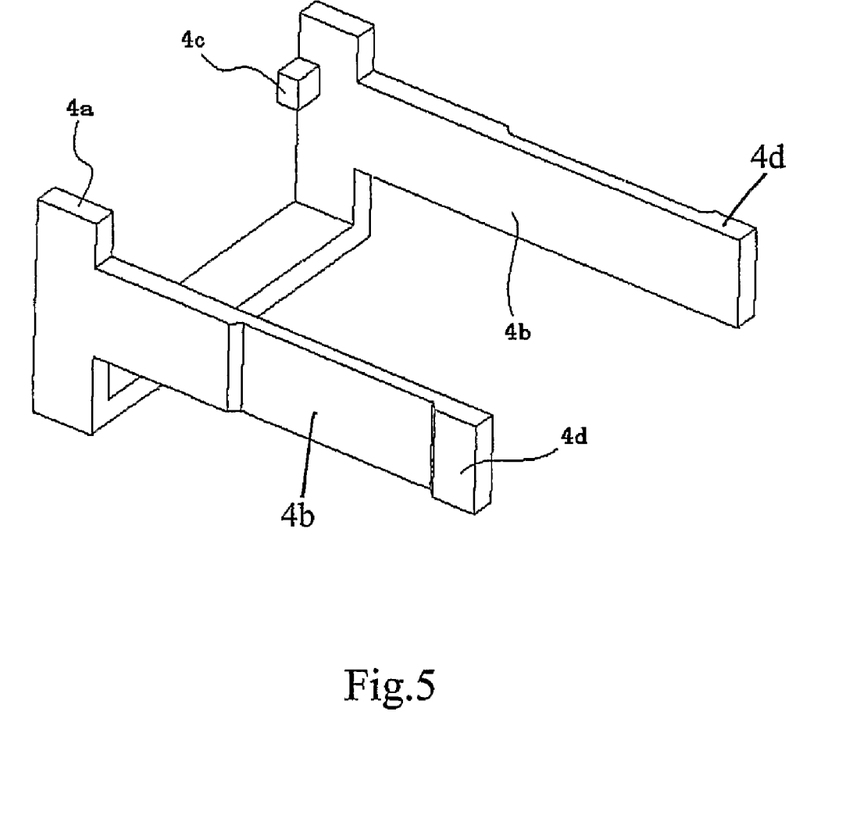
FIG. 5 is a structural schematic view of the latching slider 4.

As shown in FIG. 5, the latching slider d is comprised of a U shaped body 4a and two delatching arms 4b perpendicular to each other. Each delatching arm 4b extends from the two side arms of the U shaped body 4a and is substantially perpendicular to the two side arms of the U shaped body 4a. And a spring briquetting 4c is provided on the U shaped body 4a, with a delatching block 4d provided at a front end of the delatching arm 4b.

5. Briquetting 6

Figure 6:
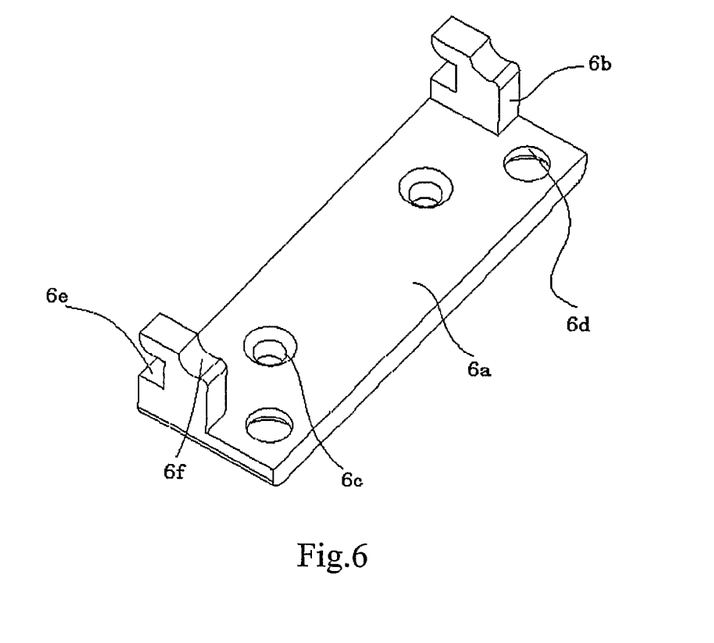
FIG. 6 is a structural schematic view of the briquetting 6.

As shown in FIG. 6, the briquetting 6 comprises a rectangular briquetting plate 6a and pin briquettings 6b that are provided at both ends of the briquetting plate 6a and substantially perpendicular to the briquetting plate 6a. Fixing holes 6c and counterbores 6d are provided at predetermined positions on the briquetting plate 6a, respectively. Stop slots 6e and bail rotor pin fixing slots 6f are provided on the pin briquetting 6b.

Next, the connection and interaction relationship between the respective constituent parts will be described in detail.

1. The Engagements Among the Bottom Housing 1, the Latching Slider 4 and the Spring 5.

The spring 5 as an example of the elastic element is provided in the spring fixing slot 1e on the bottom housing 5. The spring briquetting 4c of the latching slider 4 forms a square hole with the spring fixing slot 1e to confine the movement of the spring 5. To be specific, an end of the spring 5 acts on the bottom housing 1, the other end of the spring 5 acts on the spring briquetting 4c of the latching slider 4 to apply elastic force thereof to the latching slider 4. The two delatching arms 4b of the latching slider 4 slides in the latching slider slot 1f of the bottom housing 1.

2. The Engagements Among the Bottom Housing 1, the Bail 3 and the Briquetting 6

The bail rotor pin fixing slot 1d on the bottom housing 1 and the bail rotor pin fixing slot 6f on the briquetting 6 define a circular hole. The rotor pin 3a of the bail 3 rotates in the circular hole so that the bail can pivot with respect to the bottom housing 1 to drive the latching unit 4 so that the latching unit 4 can be moved with respect to the bottom housing 1 between a locked position, where the latching unit 4 engages with the cage to lock the latching unit 4 with a cage (not shown), and a unlocked position, where the latching unit 4 disengages with the cage to unlock the latching unit 4 from the cage, (this will be further described later).

Figure 1:
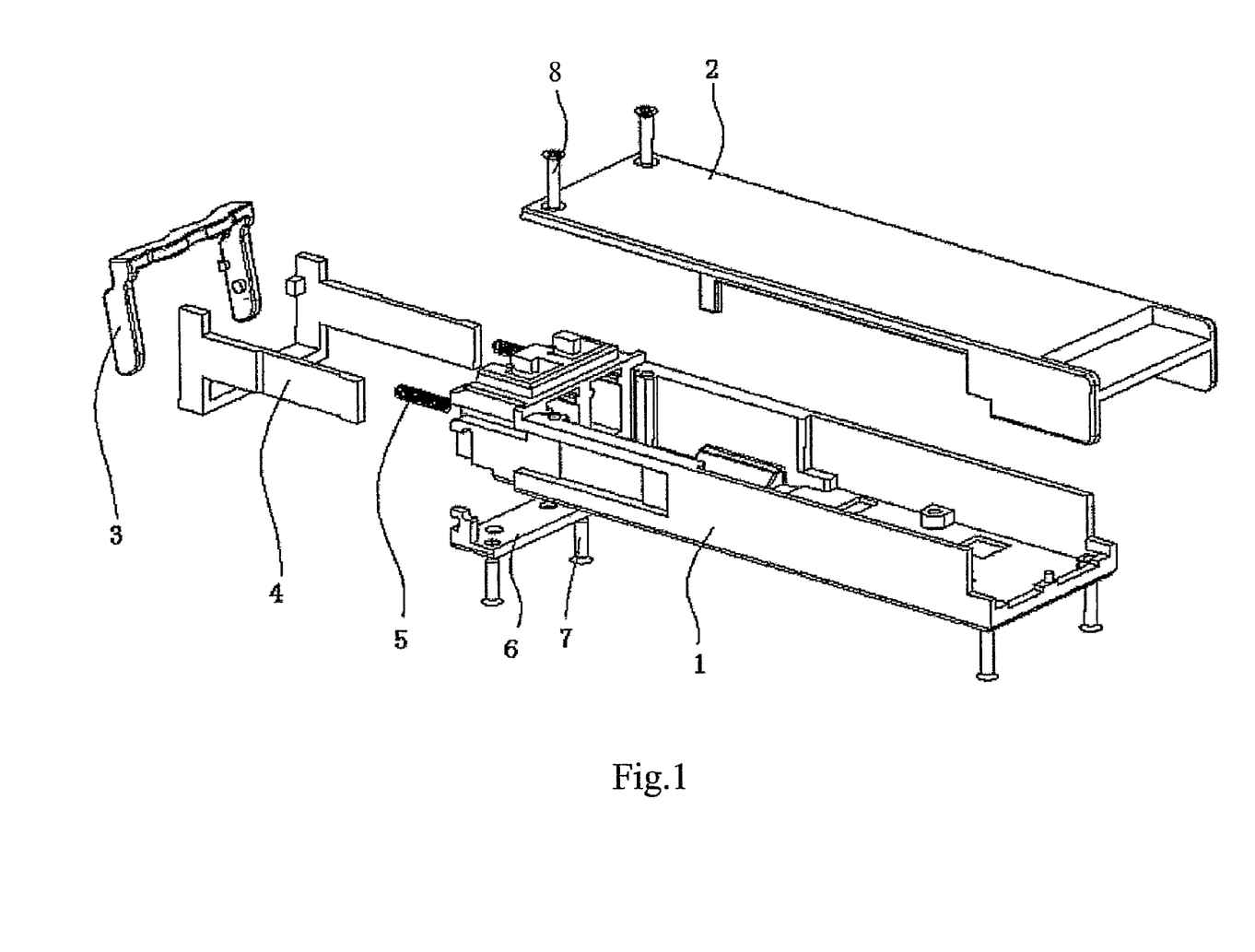
FIG. 1 is a structural schematic view of the present invention.

The fixing hole 6c of the briquetting 6 engages with the briquetting fixing pin 1b of the bottom housing 1 for the convenience of the relative positioning of the briquetting 6 with the bottom housing 1. As shown in FIGS. 1 and 6, the briquetting 6 is fixedly connected with the bottom housing via screws 7 penetrating through the counterbores 6d and the screw holes 1c. As shown in FIG. 1, the total amount of the screws 7 is two. Obviously, the present invention is not limited to this amount, and any suitable amount of screws can be used.

3. The Engagement Between the Bail 3 and the Latching Slider 4

Under the effect of the spring 5, the two suspending arms 3d of the bail 3 can always tangentially contact with two side arms of the U shaped body 4a, to drive the latching unit 4 so that the latching unit 4 can be movable between a locked position and an unlocked position with respect to the bottom housing 1.

4. The Engagement Between the Bottom Housing 1 and the Top Housing 2.

The bottom housing 1 is fixedly connected with the top housing 2 by screws 8. The screws 8 can be the one with same or different shapes or types as the screws 7. As shown in FIG. 1, the number of the screws 8 is four. Obviously, the present invention is not limited to this, and any suitable amount of screws can be used.

Then, the operating steps of the bail type unlocking device for an opto-electronic module according to the present invention will be described in detail in the following.

Figure 7:
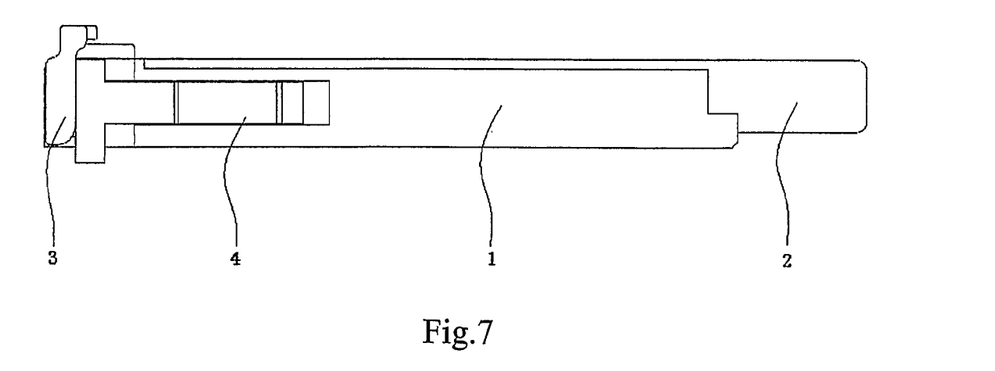
FIG. 7 is a schematic view showing the start position of the present invention.

As shown in FIG. 7, the position of the bail 3 is the start position for unlocking, i.e., locked position, in which the bail type unlocking device for an opto-electronic module of the invention is in an operating state. That is, the opto-electronic module is locked in a cage (not shown). In the locked position, an operator rotates the bail 3, and the bail 3 pivots around the rotating pin 3a as the pivot axis, and a force is exerted on the latching slider 4 via the contact point of the bail 3 with the latching slider 4. Specifically, the two suspending arms 3d of the bail 3 always tangentially contact the two side arms of the U shaped body 4a of the latching unit 4 to form contact points. Meanwhile, resistant force of the spring 5 provided between the latching unit 4 and the bottom housing 1 is exerted on the latching slider 4.

Figure 8:
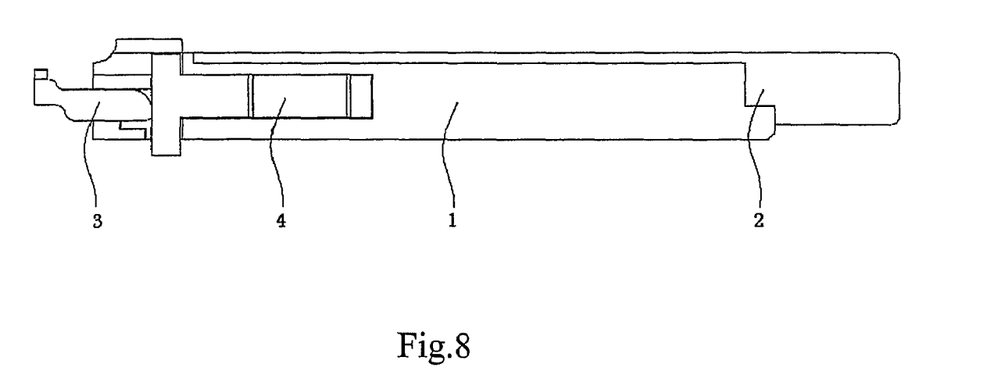
FIG. 8 is a schematic view showing the end position of the present invention.

When the operator further rotates the bail 3 to its horizontal position, the stop pin 3b of the bail 3 contacts the stop slot 6e on the briquetting 6, so that the movement of the bail 3 is stopped, as shown in FIG. 8. At this time, the delatching block 4d of the latching slider 4 has pushed up the elastic piece locked in the module. That is, the latching slider 4 is positioned at the unlocked position, and the latching slider 4 disengages with the cage to unlock the latching slider 4 from the cage. At this time, the operator can take out the module from the cage by horizontally pulling the bail 3.

Then, the operator releases the bail 3, and the latching slider 4 starts resetting operation by means of the action of the spring 5. Consequently, a force is transmitted to the bail 3 via the contact point of the bail 3 with the latching slider 4, and the bail 3 can be reset and the unlocking operation is completed.

Although a preferred embodiment has been shown and described, it would be appreciated by those skilled in the art that changes may be made in these embodiments without departing from the principles and spirit of the invention, the scope of which is defined in the claims and their equivalents.

The invention claimed is:

1. A bail type unlocking device for an opto-electronic module for unlocking the opto-electronic module in a locked position from a cage, the unlocking device comprising:
   a bottom housing;
   an operating unit;
   a latching unit;
   an elastic element; and
   a briquetting; wherein:
   the latching unit is movably engaged with the bottom housing;
   the elastic element is provided between the latching unit and the bottom housing, and the latching unit can be moved relative to the bottom housing under the elastic force of the elastic element;
   the operating unit is configured to be engaged with the bottom housing, when an external force from an operator is applied to the operating unit, the operating unit pivots around a pivot axis thereof with respect to the bottom housing to drive the latching unit so that the latching unit can be movable with respect to the bottom housing between a locked position, where the latching unit engages with the cage to lock the latching unit with the cage, and a unlocked position, where the latching unit disengages with the cage to unlock the latching unit from the cage;

the briquetting is fixed on the bottom housing and engages with the operating unit, when the latching unit is located at the unlocked position, the briquetting restricts the pivot movement of the operating unit around the pivot axis with respect to the bottom housing;

the latching unit includes a U shaped body and two delatching arms, wherein the U shaped body is perpendicular to the delatching arms;

the U shaped body is provided with a spring briquetting;

delatching blocks are provided at an end of the delatching arms; and an end of the elastic element acts on the bottom housing, and the other end of the elastic element acts on the spring briquetting of the latching unit.

2. The unlocking device according to claim 1, further comprising; a top housing which is fixedly connected to the bottom housing.

3. The unlocking device according to claim 1, wherein the bottom housing have a substantially rectangular parallelepiped chamber body.

4. The unlocking device according to claim 3, wherein the top housing is a rectangular cover adaptable to the bottom housing.

5. The unlocking device according to claim 3, wherein first sliding slots are provided at both sides of the chamber body, and the latching unit slides in the first sliding slots.

6. The unlocking device according to claim 3, wherein second sliding slots are provided at both sides of the chamber body, and the elastic element slides in the second sliding slots.

7. The unlocking device according to claim 1, wherein second sliding slots are provided at both sides of the chamber body, and the elastic element slides in the second sliding slots.

8. The unlocking device according to claim 7, wherein the elastic element is a compression spring.

9. The unlocking device according to claim 1, wherein the operating unit is a substantially U shaped half ring which comprises a handhold cross arm and two suspending arms.

10. The unlocking device according to claim 9, wherein each suspending arms has a rotor pin as the pivot axis and a stop pin.

11. The unlocking device according to claim 1, wherein the briquetting comprises a substantially rectangular briquetting plate; and pin briquettings provided at both ends of the briquetting plate.

12. The unlocking device according to claim 11, wherein the briquetting plate comprises a positioning hole and counterbores; and pin briquettings comprise a stopping slot and a rotor pin fixing slot.

13. The unlocking device according to claim 12, wherein a briquetting fixing pin and a screw hole are provided on the bottom housing; the fixing hole engages with the briquetting fixing pin; and the briquetting is fixedly connected with the bottom housing via a screw penetrating through the counterbore and the screw hole.

14. The unlocking device according to claim 3, wherein rotor pin fixing slots are provided at both sides of the chamber body.

15. The unlocking device according to claim 14, wherein the briquetting comprises a substantially rectangular briquetting plate; and pin briquetting provided at both ends of the briquetting plate, wherein the briquetting plate comprises a fixing hole and counterbores; and the pin briquetting comprise a stopping slot and a rotor pin fixing slot.

16. The unlocking device according to claim 15, wherein the rotor pin fixing slot on the bottom housing define a circular hole with the rotor pin fixing slot in which the pivot axis (a) rotates.

17. The unlocking device according to claim 15, wherein the operating unit is a substantially U shaped half ring which comprises a handhold cross arm and two suspending arms; each of the suspending arms has a rotor pin as the pivot axis and a stop pin.

18. The unlocking device according to claim 16, wherein the stop pin of the operating unit contacts the stop slot of the pin briquetting so that the pivot movement of the operating unit can be stopped.

19. The unlocking device according to claim 1, wherein the operating unit is a substantially U shaped half ring which comprises a handhold cross arm and two suspending arms.

20. The unlocking device according to claim 19, wherein the two suspending arms of the operating unit always tangentially contact the U shaped body of the latching unit.

21. The unlocking device according to claim 20, wherein the elastic element is a compression spring.

22. A bail type unlocking device for an opto-electronic module, comprising:

a bottom housing of a rectangular parallelepiped chamber body having a plurality of sliding slots;

a top housing;

a bail being formed as a U shaped half ring having a handhold cross arm and two suspending arms, each suspending arm having a rotor pin;

a latching slider comprised of a U shaped body and two delatching arms;

a spring;

a briquetting, having a briquetting plate and a pin briquetting;

a screw; wherein:

the bottom housing is fixedly connected with the top housing via screws;

the two delatching arms of the latching slider are movably inserted into two first sliding slots at the side walls of the bottom housing;

the spring is provided in two second sliding slots at side walls of the bottom housing to elastically acting between the latching slider and the bottom housing; the two suspending arms of the bail are inserted into the bottom housing to pivot around a rotor pin with respect to the bottom housing and the latching slider;

the briquetting is fixed on the bottom housing by the screw, in which the bail forms a circular hole in which the rotor pin rotates with the bottom housing and the briquetting to achieve engagement therebetween via the circular hole;

the U shaped body is perpendicular to the delatching arms, a spring briquetting is provided on the U shaped body, and a delatching block is provided at a front end of at least one of the delatching arms; and an end of the spring acts on the bottom housing, and the other end of the spring acts on the spring briquetting of the latching slider.

23. The unlocking device according to claim 22, wherein a briquetting fixing pin and a screw hole are provided on the bottom housing; a rotor pin fixing slot, a spring fixing slot and a latching slider slot are provided at both side walls of the bottom housing.

24. The unlocking device according to claim 22, wherein the bail comprises a handhold cross arm and two suspending arms, and a rotor pin and a stop pin are provided on each suspending arm.

25. The unlocking device according to claim 22, wherein the briquetting is a rectangular parallelepiped briquetting plate with both ends provided with pin briquettings; a fixing hole and counterbores are provided on the briquetting plate; a stopping slot and a bail rotor pin fixing slot are provided on the pin briquettings.

* * * * *